April 26, 1966  SHINKICHI AKIMOTO  3,248,181
PROCESS OF CONCENTRATING SALT-WATER BY DOUBLE
SALT PRECIPITATION
Filed June 13, 1962

FIG. 1

- 1 – FUNNEL
- 2 – EVAPORATOR
- STORAGE TANK – 11
- 10 – PRE-HEATER
- 12 – COOLER
- 13 – DISCHARGE VESSEL

FIG. 2

- 26 – CONDENSER
- BITTERN VESSEL
- STORAGE TANK
- OVERFLOW VESSEL
- CONCENTRATE VESSEL

United States Patent Office 3,248,181
Patented Apr. 26, 1966

3,248,181
PROCESS OF CONCENTRATING SALT-WATER BY DOUBLE SALT PRECIPITATION
Shinkichi Akimoto, Hodogaya-ku, Yokohama-shi, Japan, assignor to Kurita Industrial Company Limited, Oyodo-ku, Osaka-shi, Japan
Filed June 13, 1962, Ser. No. 202,109
4 Claims. (Cl. 23—300)

This invention relates to the concentration of salt-water. More particularly, this invention relates to a method and apparatus for separating salts from salt-water by vacuum evaporation controlling the concentration of salt of the liquid in an evaporator. The invention furthermore relates to a method for handling brine containing scale forming compounds. Still further, the invention relates to a method of suppressing adherence of scales such as calcium carbonate and calcium sulfate to the heating surface of the evaporator so that $Ca^{++}$ in the brine may be separated within the liquid.

In general, when sea-water or brine is heated and concentrated, there first appears calcium carbonate $CaCO_3$, and when concentrated to one-fourth volume it separates calcium sulfate $CaSO_4$. These separated salts deposit on the heating surface of an evaporator and form the scale thereon. The scale is an obstruction to heat conduction. Many methods and devices have been proposed to reduce the adherence of scale on the heating surface. The usual method of removing the scale formation is by chipping the scale from the walls of process vessels and conduits employed in the treatment of brine by means of air hammers and other mechanical means. It has also been proposed to give "blowing" prior to the beginning of separation of $CaSO_4$. It is apparent that such methods for scale removal are expensive and that a fundamental solution of retarding the adherence of the scale to the evaporator walls is highly desirable.

In the course of research in the formation of separated products which are to be separated during salt-manufacturing process, I have found a defect in the existing method of analysis. According to my analysis, sodium sulfate $Na_2SO_4$ is always present in the separated product. (Analysis has demonstrated in 1961 on a paper "Japan Salt Society Journal," vol. 16, pp. 23–26.) The present invention resides in the discovery that, by washing a sample with alcohol and analyzing the wash liquid and the residue separately, the mother liquor which is adhered to the sample may be dissolved and removed into the wash liquid, leaving as a residue the crystals only that are contained in the sample. In analyzing this, I have found the presence of a double salt of $$CaSO_4\text{—}Na_2SO_4$$

and have confirmed it by X-ray diffraction.

In accordance with research in the above-mentioned double salt process which is manufactured synthetically from salt-water, I have ascertained the following facts:

(1) For more than three normality of concentration to $Na^+$, the form of the separated double salt varies with its heating temperature, such as $Na_2SO_4 \cdot CaSO_4$ at 115° C., $Na_2SO_4 \cdot 5CaSO_4 \cdot 3H_2O$ at 100° C., and $$2Na_2SO_4 \cdot CaSO_4 \cdot 2H_2O$$

at 75° C., respectively.

(2) All of the above three double salts are produced directly from $CaSO_4 \cdot 2H_2O$ without forming $$CaSO_4 \cdot \tfrac{1}{2}H_2O$$

or $CaSO_4$. When once $CaSO_4 \cdot \tfrac{1}{2}H_2O$ or $CaSO_4$ forms we cannot produce such double salts therefrom.

(3) By hydrolysis of said double salts, we can obtain $CaSO_4 \cdot 2H_2O$ immediately.

(4) Any one of said double salts forms a huge crystal on a basis of a crystal seed which is firstly separated.

The present invention has an object in the provision of an effective and economical method for concentrating salt-water to separate salts therefrom without forming the scale of such salts. Another object is to provide a novel method and apparatus for the production of fresh water from sea-water. A further object is to provide a novel method and apparatus for the manufacture of salts from sea-water. Other objects will be apparent from the following description of the invention and the accompanying drawings which diagrammatically illustrate embodiments of the invention.

These objects are realized by the present invention in which the concentrating of the salt-water is conducted under a controlled evaporation. Namely, in carrying out the evaporation, the feed of salt-water and the overflow of concentrated liquid are controlled and adjusted to keep the salt concentration of the liquid in the evaporator to 3 N to 4 N to $Na^+$. By such control it is possible to separate immediately the $Ca^{++}$, which is contained in the salt-water as a double salt of $CaSO_4$—$Na_2SO_4$ within the liquid.

As previously described, inasmuch as the heated liquid has more than 3 N of concentration to $Na^+$, $Ca^{++}$ which is contained in the feeding salt-water, is instantly separated as a double salt of $Na_2SO_4 \cdot CaSO_4$, though the form of the separated double salt differs depending upon the heating temperature. The firstly separated double salt acts as a crystal seed to $Ca^{++}$ of the newly supplied liquid. Then the crystal seed grows into a huge crystal, thus preventing the scale from adhering to the heating surface of the evaporator.

A concept of adding a crystal seed for retarding the adherence of scale to the evaporator for salt-manufacturing is, of course, not new in itself. According to prior art concepts utilizing seed addition, however, it is contemplated in such a manner that a precipitated salt in an evaporator is fed back into the evaporator so as to act as a crystal seed. At a low concentration, such as 3° Bé. to 15° Bé., however, the separated Ca-salt turns into the scale in accordance with the following process:

$$CaSO_4 \cdot 2H_2O \rightarrow CaSO_4 \cdot \tfrac{1}{2}H_2O \rightarrow CaSO_4$$

The present inventor has experimentally confirmed that only when the concentration of the liquid is increased and it reaches a constant concentration of 3 N or more to $Na^+$, it separates the above-mentioned double salts within the liquid and that the previously separated salt acts as a crystal seed to which the newly separated salt adheres. Therefore, if the liquid in the evaporator has its concentration pre-adjusted so as to separate such double salt, the formation of the simple salt of $CaSO_4$ will be suppressed from the beginning, so that only the double salt will be separated within the liquid. Accordingly, it is necessary to define a particular concentration range as a condittion to yield the double salt only in the liquid. Only when such condition has been fulfilled is it possible to produce the crystal seed which becomes a nucleus of a huge crystal of the double salt, whereby we may recognize the meaning of seed addition. This decisive condition is that the heated liquid has a concentration of more thon 3 N to $Na^+$. If it is in accord with such condition, the $Ca^{++}$, which is contained in the feeding salt-water, will be instantly sealed in as the above-mentioned double salt, thus suppressing the formation of scale.

Sea-water is generally expressed as including NaCl, $CaSO_4$, $MgSO_4$, $MgCl_2$, $MgBr_2$, KCl, etc. But, as proposed by Lyman and Fleming (J. Marine Research 2, 134–146, 1940), it is reasonable to consider the composition of sea-water as NaCl, $Na_2SO_4$, $MgCl_2$, KCl, $MgBr_2$, etc. in the dynamic process of the concentration of sea-water. The following experiment will prove this consideration to be proper and right.

The boling liquid (102° C.) of sodium chloride (170 g./l.) was subjected to a constant volume evaporation, dropping therein calcium sulfate $CaSO_4$ solution (1.6 g./l.). The table which follows shows the liquid composition in the progressive increase of $CaSO_4$ dropping.

|  | A | B | C | D |
|---|---|---|---|---|
| Added $CaSO_4$ solution (ml.) | 3,000 | 6,000 | 9,000 | 12,000 |
| CaO/l. in the separated mother liquor | 2.0306 | 2.7016 | 2.8225 | 2.5654 |
| $SO_4$ equivalent to CaO (g./l.) | 8.4570 | 11.2451 | 11.7482 | 10.6779 |
| Actual value of $SO_4$ (g./l.) | 8.0732 | 10.9048 | 8.8986 | 8.1899 |
| Balance (g./l.) | 0.3788 | 0.3403 | 1.9496 | 2.4880 |

Consequently, the above-mentioned balance of $SO_4$ remains dissolved in the form of calcium chloride $CaCl_2$ equivalent to the said balance. Since it is gradually stored, the following reaction will take place:

$$2NaCl + CaSO_4 = Na_2SO_4 + CaCl_2$$

Then, the produced $Na_2SO_4$ unites with the subsequently feeding $CaSO_4$ to separate in the form of the double salt. Namely it shows that CaO in the liquid is stored since $CaCl_2$ is left in the liquid. In other words, it may be stated that the $Na_2SO_4$ equivalent to the residual CaO has turned to a double salt.

And further, the composition of salt solution for the manufacture of the double salt should have $Cl^-$ and a small amount of $SO_4^{--}$ mixed with $Na^+$, in order to function satisfactorily. The following experiments exhibit results obtained by operating the process just described.

Experiment A

Salt solution (170 g./l.) in boiling state was subjected to a constant volume evaporation, adding thereto $CaSO_4$ solution (1.6 g./l.). The resultant separate had the composition of:

|  | Percent |
|---|---|
| $Na_2SO_4 \cdot CaSO_4$ | 33.192 |
| $CaSO_4$ | 66.808 |

Experiment B

Sodium chloride solution (170 g./l.) in boiling state was subjected to a constant volume evaporation, supplying thereto sea-water. The resultant separate had the composition of:

|  | Percent |
|---|---|
| $Na_2SO_4 \cdot CaSO_4$ | 49.875 |
| $CaSO_4 \cdot \frac{1}{2}H_2O$ | 38.778 |
| $CaSO_4$ | 11.346 |

Experiment C

Sodium sulfate solution (200 g./l.) in boiling state was subjected to a constant volume evaporation, supplying thereto sea-water. The resultant separate had the composition of 100% of $Na_2SO_4 \cdot CaSO_4$.

Experiment D

Different concentrations of salt solution in boiling state were subjected to a constant volume evaporation, adding thereto $CaSO_4$ solution (1.6 g./l.), respectively. A comparison of the resultant separates is set forth in the following table:

| Specific gravity of salt solution | $Na_2SO_4 \cdot 5CaSO_4 \cdot 3H_2O$ | $CaSO_4 \cdot \frac{1}{2}H_2O$ | $Na_2SO_4 \cdot CaSO_4$ |
|---|---|---|---|
| 14.1° Bé | 25.571% | 74.429% | 0% |
| 21.4° Bé | 35.999% | 64.001% | 0% |
| 22.9° Bé | 79.665% | 20.335% | 0% |
| 25.6° Bé | 96.821% | 0% | 3.179% |
| 26.1° Bé | 84.907% | 15.092% | 0% |
| 27.5° Bé | 74.328% | 25.671% | 0% |

Experiment E

The following table shows a comparison of the composition of the separates obtained by a constant volume evaporation to an extent mentioned below of boiling sea-water, respectively:

| Concentration | $Na_2SO_4 \cdot 5CaSO_4 \cdot 3H_2O$ | $CaSO_4 \cdot \frac{1}{2}H_2O$ |
|---|---|---|
| 14.4° Bé | 52.979 | 47.021 |
| 19.4° Bé | 81.917 | 18.083 |
| 23.1° Bé | 80.456 | 19.543 |
| 28.7° Bé | 89.985 | 10.015 |

Experiment F

Bittern of the by-product of salt-manufacturing was diluted with water to prepare several concentrations of aqueous bittern solution and heated to the boiling state, respectively. These boiling liquids were subjected to a constant volume evaporation, adding thereto $CaSO_4$ solution (1.6 g./l.), respectively. Obtained the following composition of separates:

| Specific gravity of heated liquid | $CaSO_4 \cdot \frac{1}{2}H_2O$ | $CaSO_4 \cdot 2H_2O$ | $Na_2SO_4 \cdot CaSO_4$ | $Na_2SO_4 \cdot 5CaSO_4 \cdot 3H_2O$ |
|---|---|---|---|---|
| 34.4° Bé | 94.507 | 0 | 5.492 | 0 |
| 22.4° Bé | 25.162 | 0 | 0 | 64.838 |
| 21.6° Bé | 50.152 | 0 | 0 | 49.848 |
| 18.1° Bé | 51.559 | 0 | 0 | 48.441 |
| 13.6° Bé | 49.248 | 0 | 0 | 50.752 |
| 10.8° Bé | 0 | 83.391 | 0 | 16.609 |

As it will be understood from the above experiments, the best concentration for separating the double salt of $Na_2SO_4 \cdot CaSO_4$ is that the boiling liquid contains beforehand a small amount of $SO_4^{--}$ as well as $Na^+$ and $Cl^-$ and that the $Na^+$ concentration is more than 3 N. According to the Experiment F, the rate of separation of the double salt is not high in spite of larger content of $Cl^-$ and $SO_4^{--}$ in the bittern. But this is due to the lack of $Na^+$ content therein.

The herein described invention is characterized by the fact that the heated liquid in the evaporator is adjusted to have a concentration of 3 N or more to $Na^+$ prior to the feed of salt-water which is to be concentrated, thus $Ca^{++}$ in the feeding salt-water is instantly sealed in as the double salt of $Na_2SO_4 \cdot CaSO_4$ within the liquid in the evaporator. That is to say, there yields a crystal seed of the double salt, hence newly separated double salt adheres to the previously separated double salt, or crystal seed, so as to form a huge crystal, while retarding the formation of scale deposit on the heating surface of the evaporator. The invention may be applied satisfactorily to an apparatus for producing fresh water from sea-water or to an apparatus for manufacturing salts from brine.

In the operation of a condenser in ship's engine, when the exhaust gas from a diesel engine is used as the heating source, the supplied sea-water is used as feeding liquid and 20% sodium chloride solution as circulating liquid, the water content in the sea-water evaporates off gradually and it becomes thicker with solid matter. In the operation of a concentrating tank of salt-manufacturing, when supplied brine is the material liquid and is fed the mother liquor of salt-manufacturing or 20% sodium chloride solution, the water content in such salt-water evaporates off and the amount of solid matter increases gradually, and at last sodium chloride crystallizes out. If this operation is carefully carried out so that the overflow of highly concentrated liquid takes place corresponding to the amount of supplied salt-water, the concentration of liquid in the tank will be kept at a proper constant degree, so that it is possible to operate the evaporation continuously.

In the salt-manufacturing apparatus, the evaporator is preferably operated with multi stage apparatus including a concentrating tank and crystallizing tank. In the stage of the concentrating tank, the $Ca^{++}$ in the salt-water is sealed in as the double salt of $Na_2SO_4 \cdot CaSO_4$, creating a huge crystal of said salt. This huge crystal is discharged through an overflow pipe together with the concentrated liquid in which the double salt is suspended, and it is transferred to a precipitation tank. The amount of overflow of the concentrated liquid is in accord with that of the supplying salt-water. Now, the liquid in the precipitation tank is divided into two phases, a precipitate and a concentrated clear liquid. Substantially all of the precipitate is the double salt of $Na_2SO_4 \cdot CaSO_4$ in which is sealed the $Ca^{++}$ of the original salt-water. The concentrated clear liquid is fed to the crystallization tank where the crystal of sodium sulfate is obtained.

Since the $Ca^{++}$ does not remain dissolved in the concentrated clear liquid, the concentration at the stage of crystallization does not need any further treatment, such as addition of mother liquor or bittern as is employed in the conventional process. Accordingly, the composition of the concentrated liquid is the same as that of the orignal salt-water, which means that there is no separation of impurities until the completion of crystallization of the salt. In these circumstances, sodium chloride of good quality is obtained commercially and economically. Furthermore, the bittern component in the salt-water are all separated and recovered as bittern. According to the present process, therefore, salt-manufacturing is carried out so rationally.

While in the condenser, the evaporated water component is cooled and condensed by a cooler to convert the steam to a distilled water. As cooling medium, the feeding salt-water is preferably used to preheat itself. Because of the considerably high concentration of the circulating liquid, elevation of the boiling point is also advanced greatly. By flash distillation of this liquid, therefore, there is an increase of about 20% for obtaining pure water as compared with that of the flash distillation of plain water. As the heat source, any kind of heat may be utilized, e.g. solar heat, burning of petroleum or coal, electric heat, exhaust gas heat, etc.

The apparatus for carrying out the process may be of conventional proper design although it is desirable to have special means to achieve the present objects. Suitable means are shown in the accompanying drawings, wherein FIG. 1 shows systematically a water-producing apparatus utilizing an exhaust gas heat; and FIG. 2 shows systematically a multi stage salt-manufacturing apparatus.

Referring to FIG. 1, 1 is a funnel through which discharges the exhaust gas of a diesel engine. Liquid is forced through a heating tube 2 by a circulating pump 3 to deliver heated liquid to an evaporator 4 inside which is disposed the circulating liquid spouting vessel 5. Pipe lines 6 and 6' are connected to the evaporator 4 for feeding and returning the circulating liquid. The evaporator 4 also includes a concentrated liquid overflow pipe 7 and a pipe 8 for supplying the pre-heated sea-water. A baffle plate 9 is disposed in the upper portion of the evaporator 4. A pre-heater 10 of the supplying sea-water has an outlet connected to pipe 8 and an inlet connected to a storage tank 11 containing the sea-water. a conduit 14 for the steam from the evaporator 4 passes through the preheater 10, a cooler 12 and empties into a vessel 13 which thus receives the distilled water.

The operation of the illustration shown in FIG. 1 is as follows: A 20% sodium chloride solution is prepared and fed, as the circualting liquid, to the heating tube 2 disposed within the funnel 1 by the circulating pump 3. The liquid is heated to 113° C. by the exhaust hot gas (350° C.), of the diesel engine. The heated liquid is passed through the pipe 6 into the evaporator 4, where the liquid spouts into the vessel 5. The produced steam goes through a steam conduit 14, which passes through the preheater 10 and the cooler 12 to the vessel 13. The steam conduit 14 serves to heat the surrounding sea-water in the pre-heater 10. The overflow liquid from the spouting vessel 5 is recycled, through the pipe 6' and the pump 3 to the heating tube 2.

The temperature of the overflow liquid in the vessel 5 was 100° C. The supplying sea-water could be heated to 97° C. by the pre-heater 10. Then distilled water containing less than 6 p.p.m. of Cl is obtained.

The separated precipitates and the circulating liquid is analyzed as follows.

| Composition of the precipitates: | Percent |
|---|---|
| $Mg(OH)_2$ | 0.850 |
| $Na_2SO_4 \cdot 5CaSO_4 \cdot 3H_2O$ | 93.833 |
| $CaSO_4 \cdot \frac{1}{2}H_2O$ | 0.144 |
| NaCl | ------ |
| Organic substance | 5.172 |

| Composition of the circulating liquid: | |
|---|---|
| Specific gravity (24.7° Bé.) | 1.2067 |
| MgO | 0.059 |
| $CaSO_4$ | 1.710 |
| $MgSO_4$ | 15.270 |
| $MgCl_2$ | 26.713 |
| KCl | 4.178 |
| NaCl | 266.631 |

Referring now to FIG. 2, I is a concentration tank; II, III and IV are crystallization tanks. 21 is a boiler for producing steam as a heat source; 22, 23, 24 and 25 are heating chambers disposed within the tanks, I, II, III and IV, respectively. 26 is a condenser. 27 is a storage tank of brine; 28 is a pump for supplying the brine to the first tank, or concentration tank I provided with an overflow pipe 29. 30 is an overflow vessel into which the overflow pipe 29 extends. 31 is an intermediate concentrated liquid vessel; 32 is a pump for supplying the concentrated liquid to the second tank, or crystallization tank II, through a pipe 33. 33' is a conduit to feed the liquid in the second tank II to the third tank III; and 33" is a similar conduit between the tanks III and IV. 34, 34' and 34" are salt collectors installed to the bottom of the tanks II, III and IV, respectively. 35 a bittern removal pump which takes the liquid, or bittern, from the last tank IV to the bittern receiving vessel 36 provided at its bottom with another salt collector 37.

Operation of the apparatus shown in FIG. 2 is as follows: Typical vacuum evaporators for salt-manufacturing may be utilized as the tanks I to IV; in which, for instance, the tank I is used as a concentration tank and the tanks II to IV are crystallization tanks. The tank I is fed with the liquid, as previously mentioned, having about three normality of concentration to Na+ prepared by the addition of NaCl to the brine. The boiler 21 produces hot steam and delivers it to the heating chamber 22 of the concentration tank I. The heating chamber 22 acts to evaporate the water content in the liquid in the tank I. Then concentrated liquid flows down through the overflow pipe 29 into the overflow vessel 30. This evaporation is carefully operated, by controlling the amount of the feed of the brine and the overflow of the concentrated liquid, so as to maintain the concentration of the liquid in the tank I at 3 N–4 N to Na+. This control is easily effected by measuring the specific gravity of the liquid in the tank or by adjusting a valve of the brine feeder, whereby the above-mentioned double salt $Na_2SO_4 \cdot CaSO_4$ is produced in the tank I. The concentrated liquid, in which the double salt is suspended, passes through the overflow pipe 29 to the overflow vessel 30 where the two phases are formed, the precipitate of $Na_2SO_4 \cdot CaSO_4$ and the supernatant clear liquid which is free of $Ca^{++}$ but rich in sodium chloride component. This concentrated clear liquid overflows to the vessel 31.

The evapoarted steam from the boiler 21 is delivered into the heating chamber 22 inside the tank I to heat the latter; and in turn the evaporated steam from the tank I is delivered into the heating chamber 23 to become the heat source in the second tank II, and in like manner the third and fourth tanks III and IV are successively heated by the heating chambers 24 and 25. The steam from the last tank IV is fed into the condenser 26 where it is condensed into water.

Since all of $Ca^{++}$ in the brine is removed at the stage of the first tank I, sodium chloride only will be crystallized out at the stage of the second to fourth tank. Other components are all taken out as bittern from the last tank. The salt collector 37 at the bottom of the bittern vessel 36 recovers by precipitation the salt crystal of sodium chloride which may remain suspended in the discharged bittern.

In case the salt-water is a dilute solution, the second tank may be used as concentrating stage. The concentration stage may be increased or decreased in accordance with the concentration of salt-water to be treated.

The drains which are pumped out from the heating chambers 22, 23, 24 and 25 may, of course, be recovered as pure water or re-cycled to the boiler 21. According to the present method and apparatus, 16% saving of coal could be effected for the manufacture of a ton of sodium chloride as compared with conventional method.

The features and principles underlying the invention described above in connection with specific exemplifications will suggest to those skilled in the art many other modifications thereof. It is accordingly desired that the appended claims shall not be limited to any specific feature or details thereof.

Having thus disclosed the invention, what is claimed is:

1. In a process for preparing a concentrated sodium chloride solution, the combination comprising the steps of mixing sea water with about a 20% sodium chloride solution, controlling the resultant mixed solution so that the concentration of the sodium ion is in the range of from three to four normality of concentration to the sodium ion concentration of the sea water, and evaporating the mixed solution at a temperature between 75° C. and 110° C. to precipitate a double salt of $CaSO_4$ and $Na_2SO_4$.

2. In a process for concentrating sea water, the combination comprising the steps of feeding about a 20% sodium chloride solution to salt water to increase the sodium ion concentration to a range of from three to four normality of sodium ion concentration of the salt water, evaporating the resultant solution at a temperature between 75° C. and 110° C. to form a double salt precipitate consisting of $CaSO_4$ and $Na_2SO_4$, and adjusting the rate of feed of the sodium chloride and the flow of the salt water during the evaporating step so as to maintain the sodium ion concentration in said range and thereby eliminate formation of scales of $Ca^{++}$ and $SO_4^{--}$.

3. The process as recited in claim 2 wherein the vapor obtained by evaporating the resultant solution is subsequently condensed to produce fresh water.

4. The process as recited in claim 2 wherein said resultant solution consists of a concentrated liquid consisting of a clear liquid and the double salt precipitate suspended therein, and removing the clear liquid from the double salt precipitate to recover sodium chloride.

References Cited by the Examiner

UNITED STATES PATENTS

| | | | |
|---|---|---|---|
| 1,216,187 | 2/1917 | Trump | 159—45 X |
| 1,684,935 | 9/1928 | Zalocostas | 23—303 X |
| 2,619,453 | 11/1952 | Anderson | 202 |
| 2,764,472 | 9/1956 | Cady et al. | 23—303 X |
| 2,793,099 | 5/1957 | Clarke | 23—89 |
| 2,934,419 | 4/1960 | Cook | 210—42 |
| 2,979,442 | 4/1961 | Badger | 202—57 |
| 3,026,261 | 3/1962 | Mayfield et al. | 159—47 X |
| 3,055,734 | 9/1962 | Pomykala | 23—89 |

OTHER REFERENCES

"Research and Development Progress Report No. 25," Critical Review of Literature on Formation and Prevention of Scale, Office of Saline Water, United States Department of the Interior, pp. 15 and 17, July 1959.

NORMAN YUDKOFF, *Primary Examiner.*

M. H. SILVERSTEIN, *Examiner.*

F. E. DRUMMOND, *Assistant Examiner.*